Dec. 31, 1935.   F. J. FARNCOMB   2,026,086
BLUE COATED CERAMIC ARTICLE AND METHOD AND MEANS FOR PRODUCING IT
Filed March 27, 1933
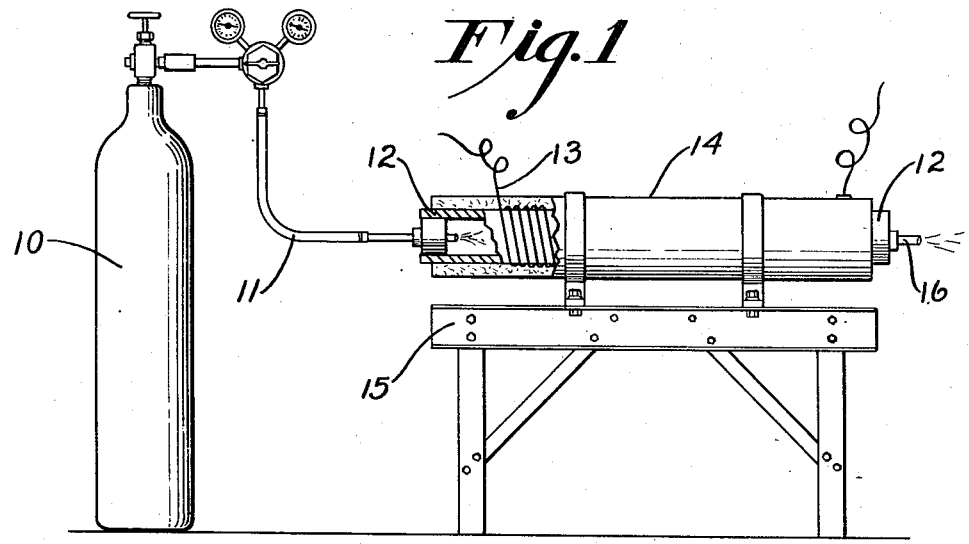
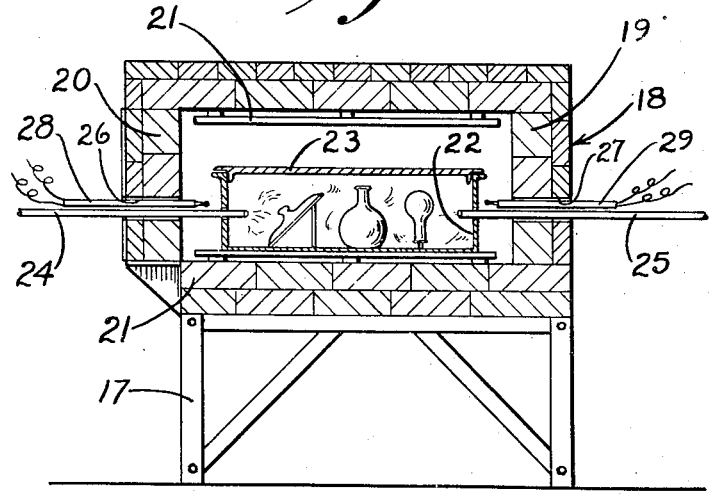
INVENTOR.
FREDERICK J. FARNCOMB
BY Dorsey & Cole
ATTORNEYS.

Patented Dec. 31, 1935

2,026,086

UNITED STATES PATENT OFFICE 2,026,086

BLUE COATED CERAMIC ARTICLE AND METHOD AND MEANS FOR PRODUCING IT

Frederick James Farncomb, Corning, N. Y., assignor to Corning Glass Works, Corning, N. Y., a corporation of New York Application March 27, 1933, Serial No. 663,095

9 Claims. (Cl. 91—70)

This invention relates to the art of iridizing and it relates more particularly to a transparent blue coating on glass and other ceramic articles and to a method and apparatus for producing it.

Heretofore glazes and enamels in a wide variety of colors have been applied to glass and ceramic articles for decorative purposes. Being composed largely of lead borate or other soft low melting fluxes, such glazes and enamels have a relatively low stability towards chemical reagents and mechanical abrasion.

On the other hand the transparent red and yellow stains, which are produced by firing into the surface of glass articles a paste containing copper or silver salts, are extremely resistant both against chemical reagents and against mechanical abrasion because the colored layer is within the body of the glass though near the surface thereof and is analogous to the color in dyed wood. However, insofar as I know, the colors of prior stains are limited and it has heretofore been impossible to produce a transparent blue stain.

Prior methods of iridizing consist in treating a heated glass article with an atomized solution or the vapor of tin chloride or iron chloride whereupon a thin adherent coating is formed on the surface of the glass. Such coatings are relatively stable towards chemical reagents and resistant to mechanical abrasion. However these coatings have no particular color but appear iridescent on account of interference colors in the light reflected therefrom and insofar as I know it has not been possible to produce such a coating in a transparent blue color.

It is the object of this invention to produce on ceramic articles a transparent blue coating which is permanently incorporated into the surface of the glass as distinguished from glazes and enamels which are merely stuck thereto by means of fluxes.

Among its features my invention embodies exposing a heated ceramic article to the fumes of tungstic or molybdic chloride and/or bromide to form thereon a thin adherent coating of tungstic or molybdic oxide and subsequently heating the article in a reducing atmosphere or treating by other suitable reducing means to convert the coating of tungstic or molybdic oxide to a lower oxide presumably the respective pentoxide and cooling the article in a non-oxidizing atmosphere.

My invention further resides in the novel construction, combination and arrangement of parts to be more fully described herein, claimed in the appended claims and illustrated in the accompanying drawing which illustrates the preferred embodiment of my invention and in which:

Fig. 1 is a front elevation of an apparatus for generating tungstic chloride or molybdic chloride vapors having a portion of the heating device cut away to show the construction thereof; and Fig. 2 is a vertical section of an electric muffle adapted for heating and cooling ceramic articles in reducing and neutral atmospheres.

In Fig. 1 a source of chlorine gas such as a steel cylinder 10 is connected by a tube 11 to one end of a combustion cylinder 12 which is composed of refractory material such as sillimanite and which is provided with heating means, in this case, an electric resistance element 13 over which is a layer of insulating cement 14. The cylinder 12 is supported by being clamped to a table 15 or by any other suitable means. The opposite end of the cylinder 12 is provided with a delivery tube 16.

In Fig. 2 a base 17 supports a muffle, in this case, an electric muffle, indicated generally 18 comprising walls 19 and a door 20 composed of refractory material and an electric resistance element 21. A cast iron box 22 of a size that will readily fit within the muffle chamber is provided with a close fitting cover 23 and iron tubes 24 and 25 projecting from the ends and communicating with the interior thereof. Holes 26 and 27 through the door and rear wall, respectively, of the muffle allow the tubes 24 and 25 to project through and outside the muffle walls. Thermocouples 28 and 29 are inserted through the holes 26 and 27 to aid in controlling the temperature of the muffle.

In practicing my invention I place within the cylinder 12 a quantity of a mixture of tungstic oxide ($WO_3$) and carbon, preferably in the proportion nine parts of tungstic oxide to one part of carbon, and pass an electric current through the resistance element 13 sufficient to heat the cylinder and its contents to a bright red heat or about 700° C. A stream of chlorine gas from the steel cylinder 10 is passed through and over the heated mixture whereupon a chemical reaction takes place and dense white fumes are given off at the delivery tube 16, the amount and velocity of the fumes being regulated by the amount of chlorine gas passed in. The composition of these fumes is uncertain but they are presumed to be a chloride or oxy-chloride of tungsten. The ceramic article, such as a piece of glass, and preferably a borosilicate glass of high melting point such as the glass $B_2$ of the Sullivan and Taylor Patent 1,304,623, is preheated in the muffle 18 or by other suitable means to a temperature preferably of about 550° C. to 650° C. and is then treated by exposure to the fumes which issue from the tube 16. During this treatment there is deposited on the surface of the hot glass a pale greenish yellow coating which I believe to be largely composed of tungstic oxide. As soon as this coating becomes sufficiently thick to be uniformly opaque in appearance the article is placed within the cast iron box 22 in the muffle 18, the cover 23 is adjusted, and the muffle is held at a temperature of about 600° C. for approximately forty-five minutes. During this time a slow stream of illuminating gas is passed into the box 22 through the tube 24 and allowed to escape through the tube 25. At the end of this time an inert gas such as carbon dioxide or nitrogen is substituted for the illuminating gas and the muffle is cooled slowly to room temperature at the rate necessary to anneal the glass. Thereafter the glass is found to be coated with a thin transparent film of a rich blue color which is permanently incorporated with the surface so treated. It is believed that this blue film is composed largely of tungsten pentoxide ($W_2O_5$) which is formed by reduction of the film deposited in the fuming operation. Molybdic oxide may be used in lieu of the tungstic oxide and will also produce a blue film or stain presumably of molybdenum pentoxide ($Mo_2O_5$) though of somewhat poorer quality than in the case of tungsten.

In lieu of the above described method of generating the fumes the following alternative methods may also be used.

A mixture of chlorine and bromine gases may be used in which case liquid bromine is vaporized by heat from a receptacle (not shown) provided with a delivery tube which is joined into the tube 11 so that the two gases simultaneously enter the combustion cylinder 12. The fumes thus obtained are probably a mixture of the chloride and bromide of tungsten or molybdenum and are more effective than the bromide alone which is obtained by cutting off the chlorine supply and passing only bromine.

The solid salt of tungsten or molybdenum chloride and/or bromide may be volatilized by heating in the combustion cylinder 12 during which time the chlorine source 10 is disconnected and a current of inert gas such as carbon dioxide or nitrogen is passed through the tube 11 and the cylinder 12.

Instead of using a mixture of tungstic or molybdic oxide and carbon in conjunction with chlorine or bromine gas as described above the carbon may be omitted and the oxide alone used or the metal alone may be substituted for the mixture.

However, for the best results, I prefer passing chlorine gas over a heated mixture of the metallic oxide and carbon as described above.

My coating may be applied to a variety of ceramic materials including glass, glazed or unglazed porcelain, clay bodies, quartz, silica, and the like.

The successful practice of my invention depends upon the following considerations established by my researches.

Best results are obtained when the fumes from the generator appear as a dense white cloud and I have found that the proportion nine parts tungstic or molybdic oxide to one part carbon is the most suitable for obtaining this condition. Other ratios tend more or less to yield brown fumes which presumably are chlorides or oxychlorides in a lower state of oxidation and these do not produce satisfactory coatings.

Maximum stability of the finished coating is obtained by accomplishing the reduction of the initial coating at a relatively high temperature although reduction may also be accomplished at temperatures as low as room temperature. Reduction at too high a temperature results in over-reduction or conversion of the coating to a lower oxide which is brown or black. Reduction at too low a temperature tends to yield a film which oxidizes easily when reheated in the air. For example, reduction may be carried out at room temperature by treating the initial coating which is obtained in the fuming operation with a reducing solution such as metallic zinc and hydrochloric acid or by making the oxide film the cathode in an electrolytic cell containing a simple electrolyte such as dilute sulphuric acid. Coatings produced at such low temperatures are not particularly stable against oxidation by the air at elevated temperatures although they are suitable for purposes which do not require reheating.

The temperature of reduction which is conducive to maximum stability will depend to some extent on the reducing means employed. Illuminating gas is preferable as reducing agent on account of its accessibility but other reducing gases such as hydrogen are also satisfactory if their use is governed by their degree of reactivity. For example with illuminating gas best results are obtained with a treatment at about 600° C. for approximately forty-five minutes but hydrogen gas being more reactive would require a lower temperature. In any case the proper temperature and time of heating may readily be determined by trial.

After the coating has been reduced it is preferable to cool or anneal the article in an atmosphere of inert gas since the admission of air might cause oxidation at such high temperature and the continued exposure of the coating to a reducing atmosphere during cooling might cause over reduction.

Coatings produced in accordance with the preferred embodiment of my invention are stable against oxidation even when heated in the air at 300° C. for twenty-four hours and they are also stable against mechanical abrasion and the action of the common acids.

Such coatings also possess a selective absorption in the infra red and visible red regions of the spectrum which renders glasses so coated good substitutes for heat absorbing glass or blue glass. Measurement of a sample of glass having a thickness of 2 mm. and coated on one side with a film of tungsten oxide in accordance with my invention gave an absorption of 91% of the total radiant energy or heat and a transmission of 35.5% of visible light.

Furthermore the blue coatings produced in accordance with my invention are electrically conducting although the specific resistance will vary with the thickness of the coating and the degree of reduction, the resistance generally being lower for thicker coatings and for more complete reduction to the blue colored state. In one case an approximate measurement of a blue coating showed a specific resistance of the order of $4.5 \times 10^{-4}$ ohms per centimeter cube.

In the following claims the expression, "a metal of the tungsten sub-group of the sixth periodic group having an atomic weight between 95 and 185", is used to include only tungsten and molybdenum. The term, "halide", is used to include only the halogen salts, chloride and bromide.

What I claim is:

1. The method of producing a permanent blue coating on ceramic articles which includes heating the article, exposing it to the fumes of a halide of a metal of the tungsten sub-group of the sixth periodic group having an atomic weight between 95 and 185 to produce on the article a coating of the trioxide of the metal and subsequently subjecting it to reducing conditions to reduce the trioxide to the pentoxide.

2. The method of producing a permanent blue coating on ceramic articles which includes heating the article, exposing it to a mixture of the fumes of a chloride and a bromide of tungsten to produce on the article a coating of the trioxide of the metal, and subsequently subjecting it to reducing conditions to reduce the trioxide to the pentoxide.

3. The method of producing a permanent blue coating on glass articles which includes heating the article, exposing it to the fumes of tungstic chloride to produce on the article a coating of tungsten trioxide and subsequently subjecting it to reducing conditions to reduce the trioxide to the pentoxide.

4. The method of producing a permanent blue coating on glass articles which includes heating the article, exposing it to the fumes of molybdic chloride to produce on the article a coating of molybdenum trioxide and subsequently subjecting it to reducing conditions to reduce the trioxide to the pentoxide.

5. The method of producing a permanent blue coating on glass articles which includes heating the article to a temperature of 550 to 650° C., exposing it to the fumes of tungstic chloride to produce on the article a coating of tungsten trioxide and subsequently heating it to a temperature of about 600° C. for about forty-five minutes in an atmosphere of illuminating gas to reduce the trioxide to the pentoxide and cooling it in an atmosphere of an inert gas.

6. The method of producing a permanent blue coating on glass articles which includes heating the article to a temperature of 550 to 650° C., exposing it to the fumes of molybdic chloride to produce on the article a coating of molybdenum trioxide and subsequently heating it to a temperature of about 600° C. for about forty-five minutes in an atmosphere of illuminating gas to reduce the trioxide to the pentoxide and cooling it in an atmosphere of an inert gas.

7. A ceramic article having a permanent blue coating which contains the pentoxide of a metal of the tungsten sub-group of the sixth periodic group having an atomic weight between 95 and 185.

8. A ceramic article having a permanent blue coating which contains tungsten pentoxide.

9. A ceramic article having a permanent blue coating which contains molybdenum pentoxide.

FREDERICK JAMES FARNCOMB.